(12) United States Patent
Rempfler et al.

(10) Patent No.: US 11,975,416 B2
(45) Date of Patent: May 7, 2024

(54) CHANGING SYSTEM

(71) Applicant: ZÜND SYSTEMTECHNIK AG, Altstätten (CH)

(72) Inventors: Leo Rempfler, Appenzell (CH); Simon Jann, Altstätten (CH)

(73) Assignee: ZÜND SYSTEMTECHNIK AG, Altstätten (CH)

( * ) Notice: Subject to any disclaimer, the term of this patent is extended or adjusted under 35 U.S.C. 154(b) by 503 days.

(21) Appl. No.: 16/779,412

(22) Filed: Jan. 31, 2020

(65) Prior Publication Data

US 2020/0246925 A1 Aug. 6, 2020

(30) Foreign Application Priority Data

Feb. 1, 2019 (EP) ..................................... 19155065

(51) Int. Cl.
*B23Q 3/155* (2006.01)
*B26D 5/00* (2006.01)
(Continued)

(52) U.S. Cl.
CPC ........... *B23Q 3/15526* (2013.01); *B26D 5/00* (2013.01); *B26D 7/088* (2013.01); *B26D 7/2614* (2013.01);
(Continued)

(58) Field of Classification Search
CPC .... B25J 15/0491; B25J 15/04; B25J 15/0408; B25J 15/0416; B25J 15/0425; B25J 15/0433; B25J 15/0441; B25J 15/045; B25J 15/0458; B25J 15/0466; B25J 15/0475; B25J 15/0483; B26D 7/088; B26D 7/2614; Y10T 83/242
See application file for complete search history.

(56) References Cited

U.S. PATENT DOCUMENTS 3,830,122 A * 8/1974 Pearl ...................... B26D 7/088
83/941
3,848,490 A * 11/1974 Arel .......................... B26F 1/38
83/756
(Continued)

FOREIGN PATENT DOCUMENTS

| CN | 101237974 A | 8/2008 |
| CN | 105246624 A | 1/2016 |

(Continued)

*Primary Examiner* — Jonathan G Riley
(74) *Attorney, Agent, or Firm* — Muncy, Geissler, Olds & Lowe, P.C.

(57) ABSTRACT

A cutting machine having a table with a working surface is disclosed. The working surface including a crossbeam above the working surface configured to be linearly positioned parallel to a first horizontal axis, a module, mounted on the crossbeam configure to be positioned parallel to a second horizontal axis, which extends perpendicularly to the first horizontal axis, a tool holder mounted in the module configured to move in a vertical axis and rotate about the vertical axis, and to accept one of a plurality of different interchangeable tools, and a control unit, wherein the tool holder has a connection device designed to supply the tool with power and a fluid, wherein the supply with the fluid is provided via a rotary joint, and wherein the power is provide via a rotary transmitter.

13 Claims, 4 Drawing Sheets

(51) Int. Cl.
  *B26D 7/08* (2006.01)
  *B26D 7/26* (2006.01)
  *B26F 1/38* (2006.01)

(52) U.S. Cl.
  CPC ...... *B26F 1/3813* (2013.01); *B26D 2005/002* (2013.01)

(56) References Cited

U.S. PATENT DOCUMENTS

| | | | | |
|---|---|---|---|---|
| 4,133,235 A | * | 1/1979 | Gerber | B26F 1/382 |
| | | | | 83/756 |
| 4,525,918 A | * | 7/1985 | Puritz | B25J 15/04 |
| | | | | 901/50 |
| 4,624,169 A | * | 11/1986 | Nelson | B26F 1/3813 |
| | | | | 83/881 |
| 4,636,135 A | * | 1/1987 | Bancon | B25J 15/0491 |
| | | | | 483/901 |
| 4,676,142 A | | 6/1987 | Mccormick et al. | |
| 4,920,495 A | * | 4/1990 | Pilkington | B26F 1/3806 |
| | | | | 83/881 |
| 5,782,571 A | * | 7/1998 | Hufford | B25J 15/04 |
| | | | | 901/41 |
| 7,963,717 B2 | * | 6/2011 | Seger | F16B 21/165 |
| | | | | 403/322.2 |
| 2002/0144579 A1 | | 10/2002 | Alsten et al. | |
| 2003/0085681 A1 | * | 5/2003 | Sakamoto | B25J 19/0025 |
| | | | | 318/568.16 |
| 2007/0228671 A1 | * | 10/2007 | Norton | B23B 31/1071 |
| | | | | 279/2.11 |
| 2009/0127145 A1 | * | 5/2009 | Nonaka | B26D 7/00 |
| | | | | 206/349 |
| 2014/0000433 A1 | * | 1/2014 | Yamamoto | B26D 7/2621 |
| | | | | 83/886 |
| 2016/0052146 A1 | * | 2/2016 | Berrocal | B25J 15/0491 |
| | | | | 483/1 |
| 2016/0059424 A1 | * | 3/2016 | Zachary | B25J 15/0416 |
| | | | | 483/1 |
| 2016/0082522 A1 | | 3/2016 | Ostertag | |
| 2019/0375067 A1 | * | 12/2019 | Berrocal | B23Q 3/1554 |

FOREIGN PATENT DOCUMENTS

| | | |
|---|---|---|
| CN | 206326367 U | 7/2017 |
| EP | 1385674 B | 2/2004 |
| EP | 2488333 B | 8/2012 |
| GB | 2118522 A | 11/1983 |
| WO | 2011045729 A1 | 4/2011 |

* cited by examiner

CHANGING SYSTEM

The present application claims priority to European Patent application 19155065.6 filed Feb. 1, 2019 which is herein incorporated by reference in its entirety.

FIELD OF THE INVENTION

The present invention relates to a cutting machine for cutting, creasing, perforating or marking printed sheets of paper, cardboard or similar materials of plastic film, cloths or the like.

BACKGROUND OF THE INVENTION

For example, generic machinery is described in documents EP 1 385 674 B1 and EP 2 488 333 B1. Such a cutting machine comprises a working surface designed to receive at least one object and a working group movably arranged above the working surface with a knife or other cutting device for cutting objects disposed on the working surface. "Cutting" does not necessarily mean complete cutting, so that a cutting process may also include perforating or folding the object or a similar operation that can be performed with a generic machine.

SUMMARY OF THE INVENTION

The present invention relates to a cutting machine, comprising a table with a working surface, the working surface designed to receive an object to be cut, a crossbeam, arranged above the working surface, mounted on the table, and designed for linear positionability parallel to a first horizontal axis, a module, mounted on the crossbeam and adapted for linear positionability parallel to a second horizontal axis, wherein the second horizontal axis extends perpendicularly to the first horizontal axis, a tool holder mounted in the module and adapted for linear positionability parallel to a vertical axis, rotary positionability about the vertical axis, and accommodating one of a plurality of different interchangeable tools, and a control unit designed to control the cutting machine, wherein the tool holder has a connection device, wherein the connection device is designed to supply an accommodated tool with electrical energy and a fluid, in particular wherein the fluid is compressed air or a lubricant, wherein a rotary joint is provided between the module and the tool holder or on the connection device, wherein the supply with the fluid is provided via the rotary joint, wherein a rotary transmitter is provided between the module and the tool holder or at the connection device, via which the supply with electrical energy is provided, and wherein the control unit is designed to control the cutting machine for the automatic execution of a tool change. In particular, drive elements inside or on the tool to be accommodated are supplied with power.

For supplying electrical power to an accommodated tool, the connection device may comprise electrical contact elements, wherein the electrical contact elements are distributed about the vertical axis and interact with contact counter-elements of a tool to be accommodated, wherein the interaction of the contact element and the contact counter-element causes an electrical contact during the tool-receiving operation. In particular, the contact elements can be distributed concentrically around the vertical axis.

The connection device may additionally be designed to supply an accommodated tool with control data, wherein the control data is provided to control a movement of a cutting tool, pressing tool, perforating tool or marking tool accommodated in the tool. In particular, the control data are used to control drive elements within or on the tool to be accommodated. The control data can be transmitted via the existing electrical contact elements, or a separate data transmission element can be used. Such a data transmission element then interacts with a corresponding data transmission counter-element on an accommodated tool.

The connection device can be designed to read out a sensor arranged in the accommodated tool. Sensor data can also be transmitted via the existing electrical contact elements, or a separate data transmission element (optionally the same one used for the possible transmission of control data) can also be used. Such a data transmission element then interacts with a corresponding data transmission counter-element on an accommodated tool.

The tool holder can have a first alignment element which interacts with a first alignment counter-element of a tool to be accommodated, wherein the interaction of the first alignment element and the first alignment counter-element during the tool-receiving operation causes a defined rotational alignment of the tool with respect to the tool holder.

The first alignment element can be designed as a projection, in particular as a pin, so that the first alignment element can be positively immersed in the first alignment counter-element of the tool to be accommodated, which is designed as a recess, in particular as an axial groove, during the tool-receiving operation.

The tool holder may have a second alignment element which interacts with a second alignment counter-element of a tool to be accommodated, wherein the interaction of the second alignment element and the second alignment counter-element effects a defined centering of the tool with respect to the vertical axis during the tool-receiving operation.

The second alignment element can be formed as a conical recess so that the second alignment counter-element of the tool to be accommodated, which second alignment counter-element is designed as a cone, fits positively into the second alignment element and the tool is thus centered with respect to the vertical axis.

The tool holder can have an engagement element, in particular a plurality of circumferentially distributed engagement elements, which interacts with an engagement counter-element of a tool to be accommodated, wherein the interaction of the engagement element and the engagement counter-element during the tool-receiving operation causes the tool to be clamped radially with respect to the vertical axis and a positive locking preventing movement parallel to the vertical axis.

The engagement elements can be spherical in shape, distributed concentrically about the vertical axis and arranged rigidly, and can be moved radially outwards when a release actuation is controlled by the control unit, in particular wherein the release actuation takes place pneumatically.

The connection device may have a fluid plug connector for supplying an accommodated tool with a fluid, wherein the fluid connection interacts with a fluid mating connector of a tool to be accommodated, wherein the interaction of the fluid plug connector and the fluid mating connector ensures the supply of the received tool with the fluid. The fluid connection can in particular be arranged coaxially to the vertical axis. The fluid connector and/or fluid mating connector may be provided with a closure to prevent fluid leakage. For example, the fluid connector may be a fluid connection and the fluid mating connector may be a fluid plug. Conversely, the fluid connector may also be designed as a fluid plug and the fluid mating connector as a fluid connection.

The cutting machine may further comprise a tool magazine having a plurality of magazine lots, wherein the tool magazine is adapted to support the plurality of different interchangeable tools in the magazine lots, and wherein the control unit is adapted to control the cutting machine such that the cutting machine performs a tool change automatically, by moving said tool holder to said tool magazine, if a tool is in said tool holder, depositing said accommodated tool at a free magazine lot and removing a new tool to be accommodated from a occupied magazine lot, wherein the depositing of the accommodated tool and the removing of the tool to be accommodated is based on a release operation of said engagement member.

Each magazine lot has, in particular, at least three circumferentially non-uniformly spaced support elements which interact with corresponding support counter-elements of a tool to be deposited, wherein the interaction of the support elements and the support counter-elements ensures a defined rotational alignment of the tool with respect to the magazine lot during the tool deposit operation.

One of the magazine lots may in particular have a connection counter-device for diagnostic, maintenance or cleaning cycles, wherein the connection counter-device comprises at least one of electrical contact counter-elements for receiving electrical energy, data transmission counter-elements for receiving pseudo control data or for transmitting pseudo sensor data, and a fluid counter-connector for receiving a fluid.

The invention also concerns an interchangeable tool for accommodation at a tool holder of a cutting machine as described herein, wherein said tool is adapted to receive at least one of electrical energy and fluid provided by a connection device of the tool holder and to accommodate a cutting tool, pressing tool, perforating tool or marking tool.

The interchangeable tool is in particular designed for at least one of the following: supply of the fluid onto the object to be cut, in particular wherein the fluid is compressed air or a lubricant, and driving the cutting tool, pressing tool or perforating tool by means of the supply with electrical energy or the supply with the fluid.

The interchangeable tool may also have a recess, in particular an axial groove, by means of which the tool is aligned in a defined rotary manner with respect to the tool holder by positive engagement in a tool-receiving operation, a cone by means of which the tool is centered with respect to the vertical axis by positive engagement in a tool-receiving operation, an engagement counter-element, in particular a radial groove, which is so formed that, during a tool-receiving operation, the engagement elements of the tool holder are caused to clamp the tool radially with respect to the vertical axis and to form a positive connection preventing movement parallel to the vertical axis, and that, when the release actuation is controlled by the control unit, the engagement elements can be moved radially out of the engagement counter-element and the tool is thus released, and at least one of contact counter-elements for receiving electrical energy, data transmission counter-elements for receiving control data, and a fluid counter-connector for receiving a fluid.

BRIEF DESCRIPTION OF THE DRAWINGS

Further advantages of the present invention are evident from the detailed description and the drawings.

DETAILED DESCRIPTION OF THE DRAWINGS

Figure 1:
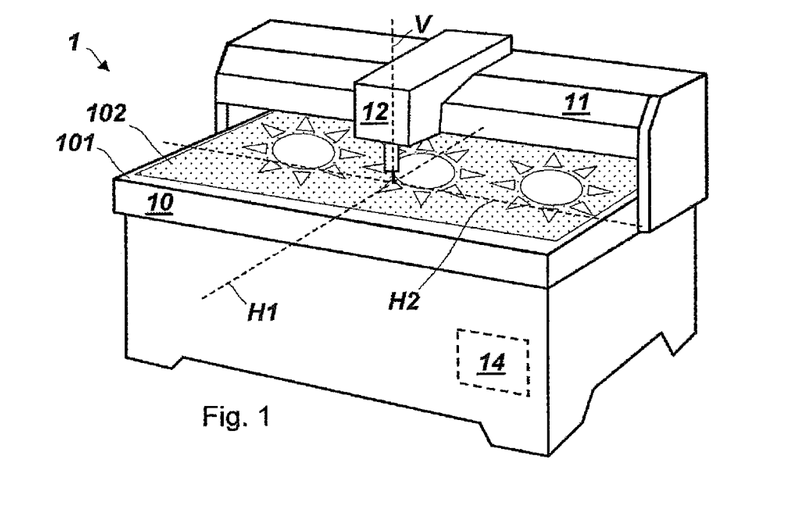
FIG. 1 shows a cutting machine according to an embodiment of the present invention.

FIG. 1 shows an embodiment of a cutting machine 1 comprising a table 10 with a working surface 101. The working surface is designed to accommodate an object 102 to be cut, in the example shown a cardboard sheet with patterns to be cut.

The cutting machine 1 has a crossbeam 11, which is arranged above the working surface and mounted on the table in such a way that it is designed for linear positionability parallel to a first horizontal axis H1. A module 12 mounted on the crossbeam 11 is designed for linear positionability parallel to a second horizontal axis H2, wherein the second horizontal axis H2 extends perpendicular to the first horizontal axis H1.

Figure 2:
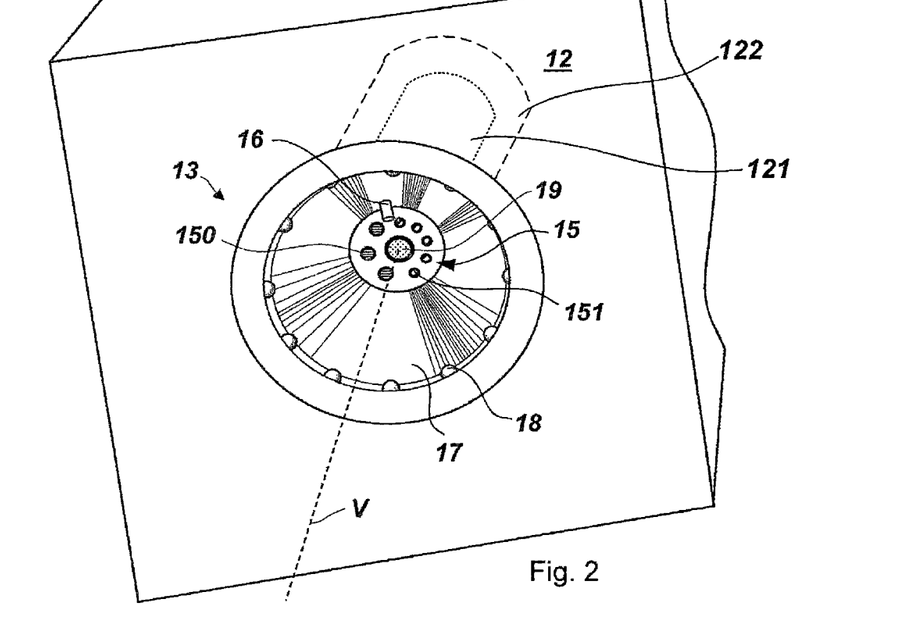
FIG. 2 shows a module with tool holder and connection device of the cutting machine according to FIG. 1.

As shown in FIG. 2, module 12 has a tool holder 13. The tool holder 13 is mounted in such a way that it is designed for linear positionability parallel to a vertical axis V and for rotary positionability around the vertical axis. The tool holder 13 is also designed to accommodate one of a large number of different interchangeable tools 2.

The cutting machine 1 also has a control unit 14, which is designed to control the cutting machine. The dotted lines indicate that the control unit 14 can be located, for example, in the interior below table 10. However, the control unit 14 can also be located at another point of the cutting machine 1 or externally.

FIG. 2 also shows a connection device 15 enclosed by the tool holder 13. The connection device 15 supplies an accommodated tool with electrical energy and a fluid, such as compressed air, a lubricant or coolant. In particular, the connection device 15 can also provide control data that can be used to control the movement of an accommodated tool. For this purpose, the accommodated tool would then have an appropriate actuator and control unit for interpreting the control data. In addition, an accommodated tool may have one or more fluid lines for the corresponding distribution of the fluid, as well as, for example, a valve for throttling a fluid flow.

If the fluid is compressed air, it can be used for different purposes (also for several from the following enumeration):
 (a) Cleaning a cutting area on the object 102 to be cut,
 (b) Cleaning of a cutting tool 4, a pressing tool, a perforating tool or a marking tool which is accommodated in the tool, (c) Driving a cutting tool 4, a pressing tool, a perforating tool or a marking tool, which is accommodated by the tool, (d) Providing sealing air at the tool or at a cutting tool 4, pressing tool, perforating tool or marking tool accommodated in the tool, for sealing. In one embodiment there may also be two or more fluid feedthroughs or fluid connectors (on the machine) for respective fluid mating connectors (on the tool), wherein each of the fluid feedthroughs serves a different purpose (cooling, lubrication, sealing air, cleaning, drive).

To enable the fluid to be supplied and electrical energy and/or data to be transferred, the cutting machine has at least one rotary joint 121 and at least one rotary transmitter 122. For example, the rotary joint 121 may be located between the module 12 and the tool holder 13 or on the connection device 15, and the rotary transmitter 122 may be located between the module 12 and the tool holder 13 or on the connection device 15.

A rotary transmitter 122 is provided between the module 12 and the tool holder 13 or on the connection device 15 to provide electrical power or data transmission. Such a rotary transmitter 122 can be designed as a slip ring or as a contactless transmitter, which functions e.g. inductively. Control data or sensor data can also be transmitted via common wireless communication technology (e.g. NFC, Bluetooth, WLAN, radio).

Figure 3:
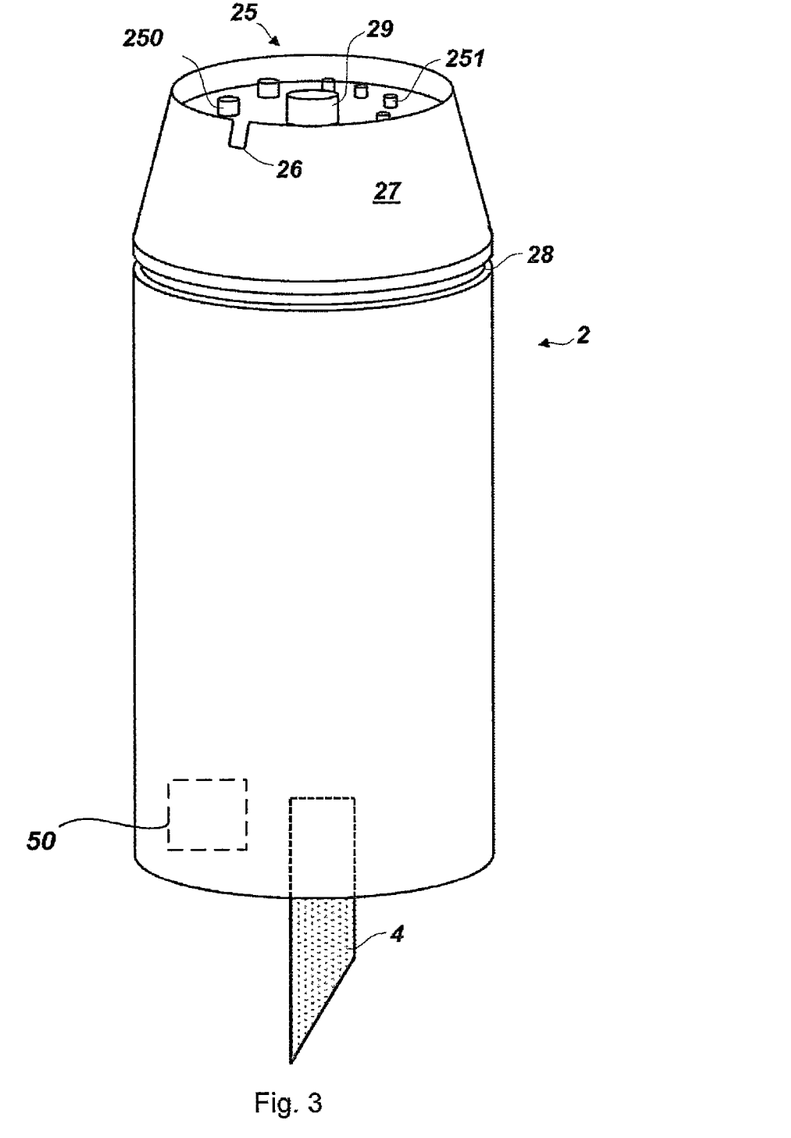
FIG. 3 shows an interchangeable tool according to an embodiment of the present invention.

In particular, electrical energy is supplied via electrical contact elements 150. If control data are to be provided by cutting machine 1, the connection device can also have at least one, in particular several data transmission elements 151, which may differ in size and/or shape from the electrical contact elements 150, but do not have to differ. Alternatively, the control data can also be transmitted via the existing electrical contact elements 150, i.e. the data transmission elements are functionally integrated into the electrical contact elements. Elements 150 and 151 are preferably used as contact plates, but can also be designed as male or female connectors, or as wireless modules. The data transmission elements are especially designed to send control data (these come from the control unit of the cutting machine) and/or to receive sensor data (these come from a sensor 50 provided in the tool 2 as shown in FIG. 3 and can be sent to the control unit of the cutting machine) or pseudo sensor data (more on this below).

The fluid is preferably supplied via a round, coaxial fluid connection 19, i.e. the fluid connection is arranged centrally to the vertical axis. The fluid connection 19 can be a male or female connection and can have one or more sealing rings.

The cutting machine is designed to perform a tool change in an automatically controlled manner. In particular, a first alignment element 16, a second alignment element 17 and an engagement element 18 can ensure that the tool change is precise and correct. A calibration or set-up process is then no longer necessary.

The first alignment element 16 ensures rotary alignment of the tool with respect to the tool holder. At a defined position in the tool holder 13, a pin is preferably arranged as the first alignment element 16, which in a tool dips into a corresponding recess as the first alignment counter-element, wherein a positive locking is achieved which makes the alignment of the tool definite and prevents an unintentional rotary adjustment. First alignment element 16 and first counter-alignment element 26 on the tool can, for example, also be designed in reverse so that the tool holder 13 has an eccentric recess as the first alignment element into which a pin or a similar element on the tool can be inserted.

The second alignment element 17 is preferably realized as a conical recess. It interacts with a corresponding cone-like arrangement on the tool, so that a positive locking can also occur here, which centers the tool relative to the vertical axis.

In another embodiment of the cutting machine in accordance with the invention, the first and second alignment elements can be combined in such a way that, for example, the conical recess has at least one axial groove or axial elevation in which a different type of counterpart engages on the tool.

The tool holder 13 still has at least one, but preferably several, engagement elements 18. The plurality of engagement elements 18 is distributed around the circumference of the tool holder 13 and is designed in such a way that it is radially rigid in a basic position and can be moved radially outwards by a release actuation. The engagement elements 18 are designed as balls, in particular bearing balls, as an example. When a tool is inserted, the engagement elements 18 engage in a corresponding engagement counter-element 28 of the tool and thus cause a positive locking action, via which the tool is clamped and an unintentional movement of the tool along the vertical axis can be prevented. In particular, the at least one engagement element or the engagement counter-element can be designed and arranged in such a way that it presses the inserted tool upwards against the conical recess through the clamping, i.e. causes a pretensioning force.

In particular, a release is actively actuated when a tool change is desired. If release actuation is omitted, the engagement element remains extended and the clamping is retained. Release actuation can, in particular, be performed pneumatically. For example, the engagement element can be pretensioned by a spring, wherein the spring force is reduced or cancelled by extending the spring travel by shifting the spring counter-support by supplying compressed air into a system designed for this purpose.

The release actuation can also be monitored, wherein the clamping condition or the position adjustment is monitored. This monitoring can be performed by the machine control (control unit 14). In particular, it can be the task of monitoring whether the tool is correctly engaged or positioned. For this purpose, e.g. a position sensor detects the axial height of an inserted tool, or in general whether a tool is inserted at all.

Figure 4:
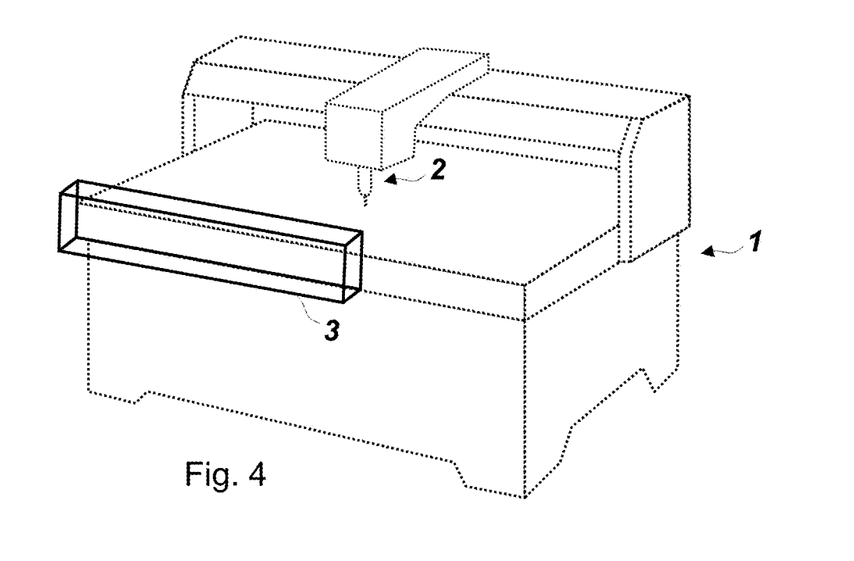
FIG. 4 shows schematically an arrangement of a tool magazine on a cutting machine according to another embodiment of the present invention.

The automatic tool change can, for example, be carried out by retrieving a new tool from a tool magazine 3 or by placing an old tool therein. FIG. 4 shows an exemplary arrangement of magazine 3 on the table of cutting machine 1. However, magazine 3 could also be integrated into the table or mounted at another point of cutting machine 1.

Figure 5:
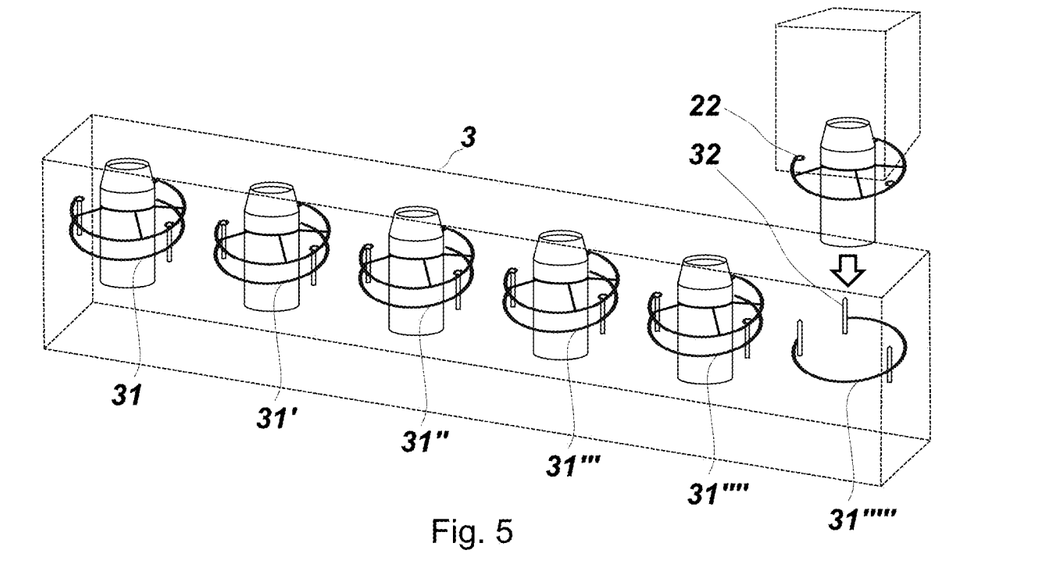
FIG. 5 schematically shows a plurality of magazine lots of the tool magazine according to FIG. 4.

As FIG. 5 shows, the tool magazine has several magazine lots 31, 31', 31", 31''', 31"", 31''''', 31"""". The magazine is designed to store a large number of different interchangeable tools in these magazine lots. If the cutting machine has such a tool magazine, the control unit is designed to control the cutting machine in such a way that the cutting machine automatically carries out a tool change by (a) moving the tool holder to the tool magazine, (b) if there is a tool in the tool holder, depositing this accommodated tool in a free magazine lot 31""" and (c) removing a tool to be newly accommodated from one of the occupied magazine lots 31, 31', 31", 31''' or 31"". The placement of the retrieved tool and the removal of the tool to be accommodated are each based on a release actuation of the engagement element described above.

As FIG. 5 shows, each magazine lot has at least three circumferentially non-uniformly spaced support elements 32 which interact with corresponding support counter-elements 22 of a tool to be placed, wherein the interaction of the support elements and the support counter-elements ensures a defined rotational orientation of the tool relative to the magazine lot during the tool placement operation. The unambiguity is established by the uneven distribution on a circular path (e.g. at 45°, 180° and 315°) or on circular paths with different radii. This means that the tool is always in a referenced starting position and calibration is no longer necessary.

Figure 7:
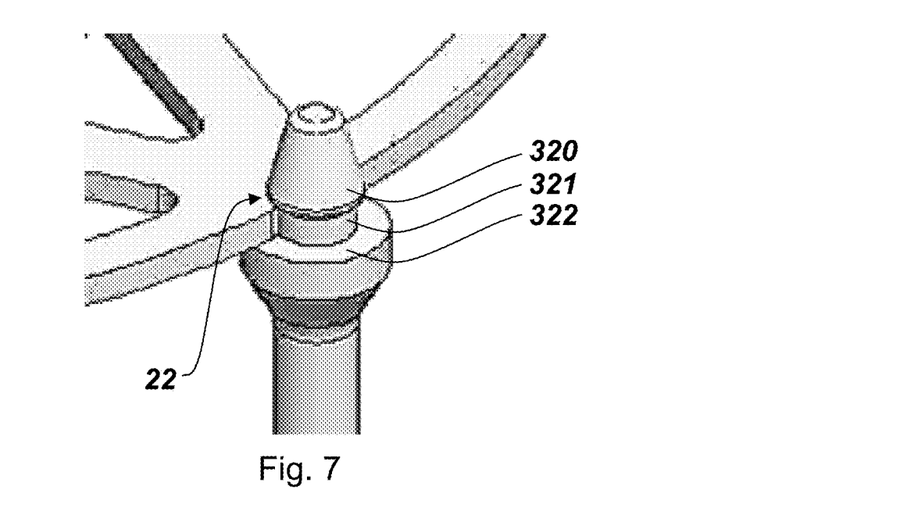
FIG. 7 shows a section of a magazine lot according to an embodiment of the present invention.

According to FIG. 7, at least one of the support elements 32 can be designed in such a way that a latching mechanism is provided. For example, the exemplary support element in FIG. 7 has a conical tip 320, a radial recess 321 and a support plate 322. The exemplary support counter-element 22 of the tool shown in FIG. 7 is a recess on the circumference of a circular frame, wherein the recess is designed so that it is centered on the tip 320 when it slides down. The smallest diameter defined by the support counter-elements 22 is preferably smaller than the largest diameter defined by the tip 320 (upper part) and larger than the smallest diameter defined by the tip 320 (lower part). This forces the frame into the radial recess 321, wherein the support elements 32 deform elastically until the frame snaps into place. The tool can then rest on the support plates 322 using the support counter-elements 22.

One of the magazine lots may also have a connection counter-device, in particular an insertable or permanently mounted one, for the purpose of diagnostic, maintenance and/or cleaning procedures. Correspondingly, such a connection counter-device comprises at least one of the following:
(a) Contact counter-elements for receiving electrical energy,
(b) data transmission elements for receiving control data and/or transmitting sensor data, and
(c) a fluid mating connector for receiving a fluid. Such a "dummy" can be approached regularly, in particular automatically, in order to accommodate it as a pseudo tool, wherein various parameters of the machine can then be tested, e.g. electrical voltage, electrical current, data transmission rate, signal strength, fluid flow rate, leak tightness, etc. For this purpose, additional sensors can also be provided on the connection counter-device, which are adapted to these parameters. It is also possible to test the engagement force of at least one engagement element, or the shape accuracy of the alignment elements, especially to detect signs of wear at an early stage.

Conversely, such a test function can also be provided for tools stored in the magazine, namely in that the magazine has a pseudo connection device (so to speak as a "pseudo machine"), which essentially resembles the connection device on the cutting machine and can therefore also have the same functional spectrum, i.e. can provide fluid, electrical energy and/or control data or read out sensor data. This pseudo connection device can be moved to the tool to be tested, or the tool to be tested can be moved to the pseudo connection device. Similar to the reverse case described above (pseudo tool is picked up by the machine), cleaning processes, flow tests, leakage tests, cooling capability tests, wear tests and/or various electrical tests can be carried out.

Figure 6:
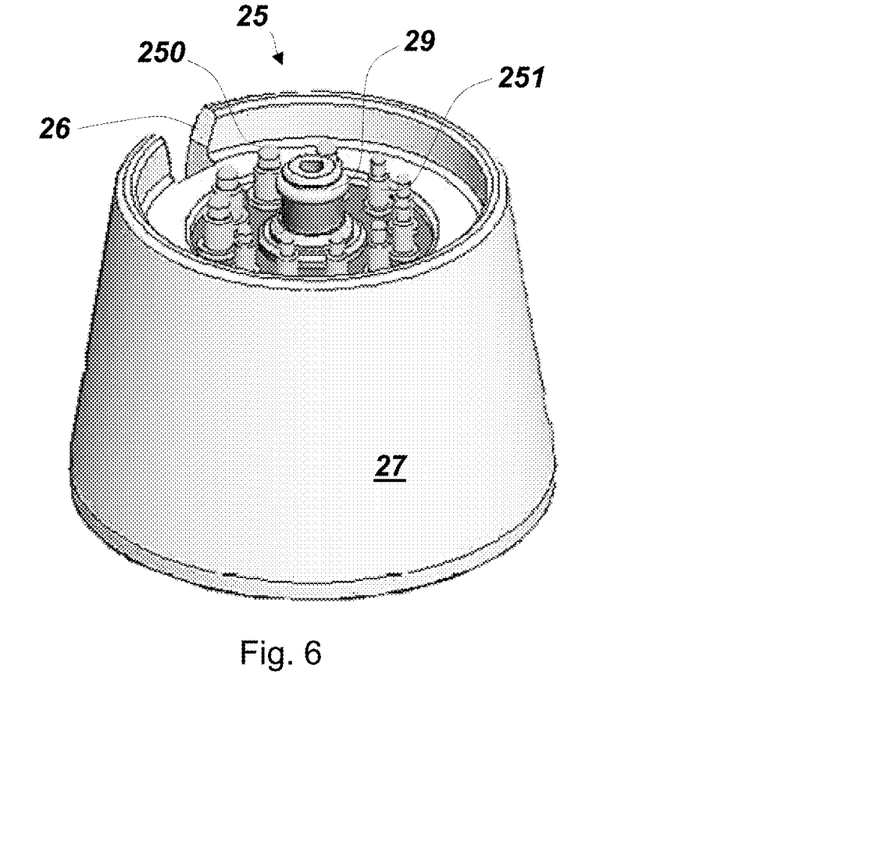
FIG. 6 shows in detail the part of a tool that interacts with the tool holder and the connection device according to an embodiment of the present invention.

A tool 2 which is suitable for cutting machine 1 according to the invention is shown in FIG. 3, as well as an embodiment of a head part of the tool is shown in FIG. 6. The tool is designed to receive at least one of the electrical energy and fluid provided by a tool holder connection device and to accommodate a cutting tool 4, pressing tool, perforating tool or marking tool. In particular, tool 2 is configured to drive the cutting tool, pressing tool, perforating tool or marking tool by means of the electrical power supply or the fluid supply. In addition to or as an alternative to driving, the tool is designed to supply the fluid to the object 102 to be cut, wherein the fluid is in particular compressed air (to remove chips), a lubricant (to facilitate the cutting process) or a coolant (to cool the tool 2 or the cutting tool 4, pressing tool, perforating tool or marking tool). The cutting machine in accordance with the invention is also suitable for creasing, perforating and marking, which is why a pressing tool, a perforating tool or a marking tool can also be provided instead of the cutting tool 4.

In particular, the tool has a recess 26, which is shown here as an example of an axial groove. On the basis of recess 26, the tool is rotatably aligned in a defined manner with respect to the tool holder by positive locking during a tool holding operation with the first alignment element 16, or the alignment is ensured. In addition, the tool can have a cone 27, which is used to center the tool with respect to the vertical axis by positive locking during a tool holding operation. Furthermore, an engagement counter-element 28 can be provided, which is designed in such a way that during a tool-receiving operation the engagement elements 18 of the tool holder effect a clamping of the tool radially to the vertical axis and a positive locking preventing a movement parallel to the vertical axis. The engagement elements 18 are moved (or can be moved) radially out of the radial groove in such a way that the tool is released when the release actuation is controlled by the control unit. This means that the depth of the groove 28 is matched to the engagement elements 18 and their displacement paths or adjustability.

The engagement counter-element 28 here is designed as a radial groove, but it can also be embodied by a large number of circumferentially arranged cavities (the engagement elements designed as balls 18 could then engage in such cavities).

As the more detailed view also shows in FIG. 6, the tool 2 shown in FIG. 3 has a connection portion 25 that corresponds to connection device 15 at the tool holder 13 side. The connection portion 25 includes contact counter-elements 250 for receiving electrical energy, data transmission counter-elements 251 for receiving control data, and a fluid plug 29 for receiving a fluid. In one embodiment, the elements 250 and 251, as shown in FIG. 6, are designed to be spring-loaded, creating a contact pressure between the elements 150 and 151 and the elements 250 and 251, thus ensuring uninterrupted contact.

In particular, the fluid plug 29 is arranged exactly centrically and is therefore exactly concentric to the vertical axis V when the tool is used. For example, a line laid longitudinally inside tool 2 leads the fluid down to the cutting area or the working surface to be machined. There, the fluid can be used to (a) remove chips, (b) dissipate the generated heat, or (c) drive a tool insert (e.g. a stroke knife) with a pneumatic device. The fluid line inside the tool can also divide into eccentric orifices on the tool, for example to (d) remove any dust from the working surface.

The tool may have a constellation of different counter-elements for current, data and/or fluid(s) corresponding to the connection device, i.e. electrical contact counter-elements, data transmission counter-elements and/or fluid mating connectors, as described in the connection device of the cutting machine above. A data transmission counter-element can also be designed as a wireless module, which is why a special embodiment of the tool can have an NFC, Bluetooth, WLAN or radio module.

Although the invention was explained on the basis of its preferred embodiment(s), many other changes and variations can be made without going beyond the scope of the present invention. Therefore, it is provided that the attached claims are intended to cover amendments and variations contained in the actual scope of the invention.

The invention claimed is:

1. A cutting machine, comprising:
   a table having a working surface configured to accommodate an object to be cut;
   a crossbeam disposed above the working surface and movably mounted on the table, the crossbeam being movable parallel to a first horizontal axis;
   a module that is movably mounted on the crossbeam, the module being movable parallel to a second horizontal axis, wherein the second horizontal axis extends perpendicularly to the first horizontal axis;
   a tool holder that is movably mounted in the module, the tool holder configured to:
   move parallel to a vertical axis,
   rotate about the vertical axis, and
   accommodate one of a plurality of different interchangeable tools,
   wherein the tool holder comprises:
   a tapered recess and an end surface, an inner space of the tool holder being defined based on the tapered recess and the end surface; and
   a connection device disposed on the end surface and configured to engage an accommodated tool during a tool-receiving operation, wherein the connection device includes a fluid feedthrough and one or more electrical contact elements, and wherein the connection device is configured to supply the accommodated tool with electrical energy via the one or more electrical contact elements and a fluid via the fluid feedthrough;
   a rotary joint disposed between the module and the tool holder or at the connection device, wherein the rotary joint is configured to supply the fluid to the connection device;
   a rotary transmitter disposed between the module and the tool holder or at the connection device, wherein the rotary transmitter is configured to supply the electrical energy to the connection device; and
   a control unit configured to control the cutting machine to automatically perform a tool change operation,
   wherein:
   the tapered recess is configured to interact with a tapered shape of the accommodated tool to center the accommodated tool with respect to the vertical axis during the tool-receiving operation,
   the connection device is configured to connect to a connection counter-device of the accommodated tool within the inner space of the tool holder during the tool-receiving operation, and
   the connection counter-device is configured to supply the electrical energy and the fluid to the accommodated tool.

2. The cutting machine according to claim 1,
   wherein the one or more electrical contact elements include multiple electrical contact elements distributed around the vertical axis and configured to electrically couple to corresponding contact counter-elements of the accommodated tool.

3. The cutting machine according to claim 1,
   wherein the connection device is configured to read out a sensor arranged in the accommodated tool.

4. The cutting machine according to claim 1,
   wherein the tool holder has a first alignment element configured to interact with a first alignment counter-element of the accommodated tool
   to provide a rotational alignment of the accommodated tool with respect to the tool holder.

5. The cutting machine according to claim 4,
   wherein the first alignment element is formed as a projection, the first alignment element being configured to dip during the tool-receiving operation in a positive-locking manner into a recess formed on the first alignment counter-element of the accommodated tool.

6. The cutting machine according to claim 1,
   wherein the tool holder has one or more engagement elements disposed adjacent to an opening of the inner space and opposite the end surface, and is configured to radially clamp with respect to the vertical axis an engagement counter-element of the accommodated tool disposed below the tapered shape and opposite the connection counter-device of the accommodated tool to prevent movement parallel to the vertical axis.

7. The cutting machine according to claim 6,
   wherein the one or more engagement elements include plural elements that are spherical in shape, distributed concentrically around the vertical axis and arranged rigidly, and are movable radially outwards when a release actuation is controlled by the control unit.

8. The cutting machine according to claim 1,
   wherein the connection device comprises a fluid plug connector configured to supply the accommodated tool with the fluid through a fluid mating connector of the accommodated tool.

9. The cutting machine according to claim 6, comprising a tool magazine having a plurality of magazine lots, wherein the tool magazine is configured to store the plurality of different interchangeable tools in the magazine lots, and wherein the control unit is configured to control the cutting machine to automatically perform a tool change operation.

10. The cutting machine according to claim 9,
    wherein one of the magazine lots is configured to store a first tool configured for diagnostic, maintenance, or cleaning cycles of the cutting machine,
    wherein the first tool comprises a corresponding connection counter-device that comprises at least one of:
    electrical contact counter-elements for receiving electrical energy,
    a data transmission counter-element for receiving pseudo control data or transmitting pseudo sensor data, or
    a fluid mating connector for receiving the fluid.

11. An interchangeable tool configured to mount on the tool holder of a cutting machine according to claim 1, comprising:
    a cutting tool; and
    a connection portion configured to accommodate the cutting tool and configured to be received by the tool holder, wherein the connection portion includes a fluid mating connector or contact counter-elements,
    wherein the contact counter-elements are configured to receive electrical energy provided by the connection device of the tool holder, or
    wherein the fluid mating connector is configured to receive a fluid provided by the connection device of the tool holder.

12. The interchangeable tool according to claim 11, wherein the connection portion is configured to perform at least one of:
- supply of the fluid onto the object to be cut, wherein the fluid is compressed air or a lubricant,
- supply of the electrical energy or the supply of the fluid to drive the cutting tool,
- supply of the fluid to lubricate a cutting area,
- supply of the fluid to cool the interchangeable tool or of the cutting tool accommodated in the interchangeable tool, or
- provision of sealing air at the interchangeable tool or at the cutting tool accommodated in the interchangeable tool.

13. The cutting machine according to claim 1, wherein a surface of the tapered recess surrounds the vertical axis and is disposed farther away from the vertical axis than the connection device.

* * * * *